United States Patent

Gunji

Patent Number: 5,222,231
Date of Patent: Jun. 22, 1993

[54] DATA PROCESSING SYSTEM HAVING A RESUME FUNCTION AND AN OPERATING METHOD THEREOF

[75] Inventor: Shizuka Gunji, Oome, Japan

[73] Assignee: Kabushiki Kaisha Toshiba, Kawasaki, Japan

[21] Appl. No.: 507,490

[22] Filed: Apr. 11, 1990

[30] Foreign Application Priority Data

Apr. 28, 1989 [JP]  Japan .................................. 1-110546

[51] Int. Cl.$^5$ ............................................. G06F 12/16
[52] U.S. Cl. .................................. 395/575; 364/280.3; 364/286.4; 364/286.5; 364/DIG. 1
[58] Field of Search ............ 364/200 MS File, 280.3, 364/900 MS File, 225, 200; 370/66; 395/275, 575, 700, 650, 325; 380/3, 4, 23, 52; 340/825.32; 371/12

[56] References Cited

U.S. PATENT DOCUMENTS

| | | | |
|---|---|---|---|
| 4,234,920 | 11/1980 | Van Ness et al. | 364/200 |
| 4,414,664 | 11/1983 | Greenwood | 364/200 |
| 4,458,315 | 7/1984 | Uchenick | 364/200 |
| 4,590,552 | 5/1986 | Guttag et al. | 364/200 |
| 4,648,031 | 3/1987 | Jenner | 364/200 |
| 4,654,792 | 3/1987 | Thomas | 364/200 |
| 4,674,038 | 6/1987 | Brelsford et al. | 364/200 |
| 4,752,068 | 6/1988 | Endo | 273/1 |
| 4,907,150 | 3/1990 | Arroyo et al. | 364/200 |
| 5,001,554 | 3/1991 | Johnson et al. | 358/86 |

FOREIGN PATENT DOCUMENTS 0230351  7/1987  European Pat. Off.

OTHER PUBLICATIONS

Manual of the Automated Patent System Mar. 8, 1990 U.S. Department of Commerce 4-pages U.S. Patent and Trademark Office.
IBM Technical Disclosure Bulletin, vol. 30, No. 5, Oct., 1987, pp. 57–58, "Security System for Personal Computers".

Primary Examiner—Michael R. Fleming
Assistant Examiner—Gopal C. Ray
Attorney, Agent, or Firm—Oblon, Spivak, McClelland, Maier & Neustadt

[57] ABSTRACT

A data processing method and apparatus have a resume function and use a password. When a power switch of a data processing system is turned on while it is selected that the resume function is to be enabled and the password is to be collated, the data processing system displays a message prompting an operator to input a password. When a predetermined password is input from a keyboard or the like, the data processing system executes resume processing, i.e., executes data processing to be continued to data processing executed immediately before the power switch was turned off. When the predetermined password is not input, the resume operation is inhibited, and a content saved by the resume function can be prevented from being disclosed to or destroyed by a third party.

10 Claims, 5 Drawing Sheets

DATA PROCESSING SYSTEM HAVING A RESUME FUNCTION AND AN OPERATING METHOD THEREOF

BACKGROUND OF THE INVENTION

1. Field of the Invention

The present invention relates to a computer having a resume function, i.e., a function of executing data processing, after the main power switch is turned back on, according to data processing state which had been in operation immediately before a main power switch was turned off.

2. Description of the Related Art

A computer having a resume function is known. The resume function is a function of resuming a job (data processing and/or display) which was in operation immediately before a main power switch was turned off when the main power switch is turned on.

The resume function is realized as follows. An ON/OFF (enable/disable) state of the resume function is set in a setup mode (installation mode). When the main power switch is turned off while the resume function is enabled, necessary data in memories, registers, and pointers are saved in a backup memory. When the main power switch is turned on again, the saved data are restored to their original locations. Thereafter, the job (data processing) continues according to the restored content.

In a conventional computer, when the resume function is enabled, even if a third party who has no right to use the computer turns on the main power switch of the computer, the contents of the data processing system immediately before the power switch was turned off is restored. For this reason, in a conventional computer having the resume function, the data saved by the resume function may be destroyed by a third party, thus posing a problem of data protection. Since a display in use when the power switch was turned off is displayed by the resume function when the power switch is turned on, the data may be presented to a third party.

SUMMARY OF THE INVENTION

The present invention has been made in consideration of the above situation, and has as its object to provide an improved computer and a data processing method.

It is another object of the present invention to provide a computer and a data processing method, which can prevent the contents saved by a resume function from being destroyed by a third party or being disclosed to the third party.

In order to achieve the above object, a data processing system having a resume function of the present invention comprises:

switch means (11) for turning on and off a main power source of the data processing system;

OFF detection means (9, 4) for detecting that the switch means (11) is turned off;

backup memory means (2), responsive to the detection result of the OFF detection means (4, 9), for holding a content of data processing executed by the data processing means (1-8, 12) immediately before the switch means (11) is turned off;

ON detection means (4, 9) for detecting that the switch means (11) is turned on;

identification data holding means (2) for holding identification data for specifying an operator;

input means (6, 8) for inputting the identification data for specifying an operator;

discrimination means (4), responsive to the ON detection means (4, 9), for discriminating whether or not identification data input from the input means (6, 8) after the switch means (11) is turned on coincides with identification data stored in the holding means (2); and means (2, 4) for, when the discrimination means (4) detects a coincidence, executing data processing, from processing executed immediately before the switch means (11) is turned off, in accordance with a storage content of the backup memory means (2).

In order to achieve the above object, a data processing method of the present invention comprises the steps of:

processing data;

turning off a power switch;

holding a content of data processing executed in the data processing step in response to OFF of the power switch;

turning on the power switch again;

inputting identification data for specifying an operator after the power switch is turned on;

collating the input identification data and prestored identification data; and executing data processing, to be continued to data processing executed before the power switch is turned off, in accordance with the contents held in the holding step when a coincidence between the two identification data is detected in the collating step.

As described above, according to the computer and the data processing method of the present invention, even if a power switch of a data processing system is turned on, resume processing is inhibited until the correct identification data is input. For this reason, the contents saved by the resume function can be prevented from being disclosed to or destroyed by a third party.

BRIEF DESCRIPTION OF THE DRAWINGS

A more complete appreciation of the invention and may of the attendant advantages thereof will be readily obtained as the same becomes better understood by reference to the following detailed description when considered in connection with the accompanying drawings, wherein:

FIG. 3 is a flow chart showing an operation when a power switch of the computer shown in FIG. 1 is turned on;

DETAILED DESCRIPTION OF THE PREFERRED EMBODIMENTS

Figure 1:
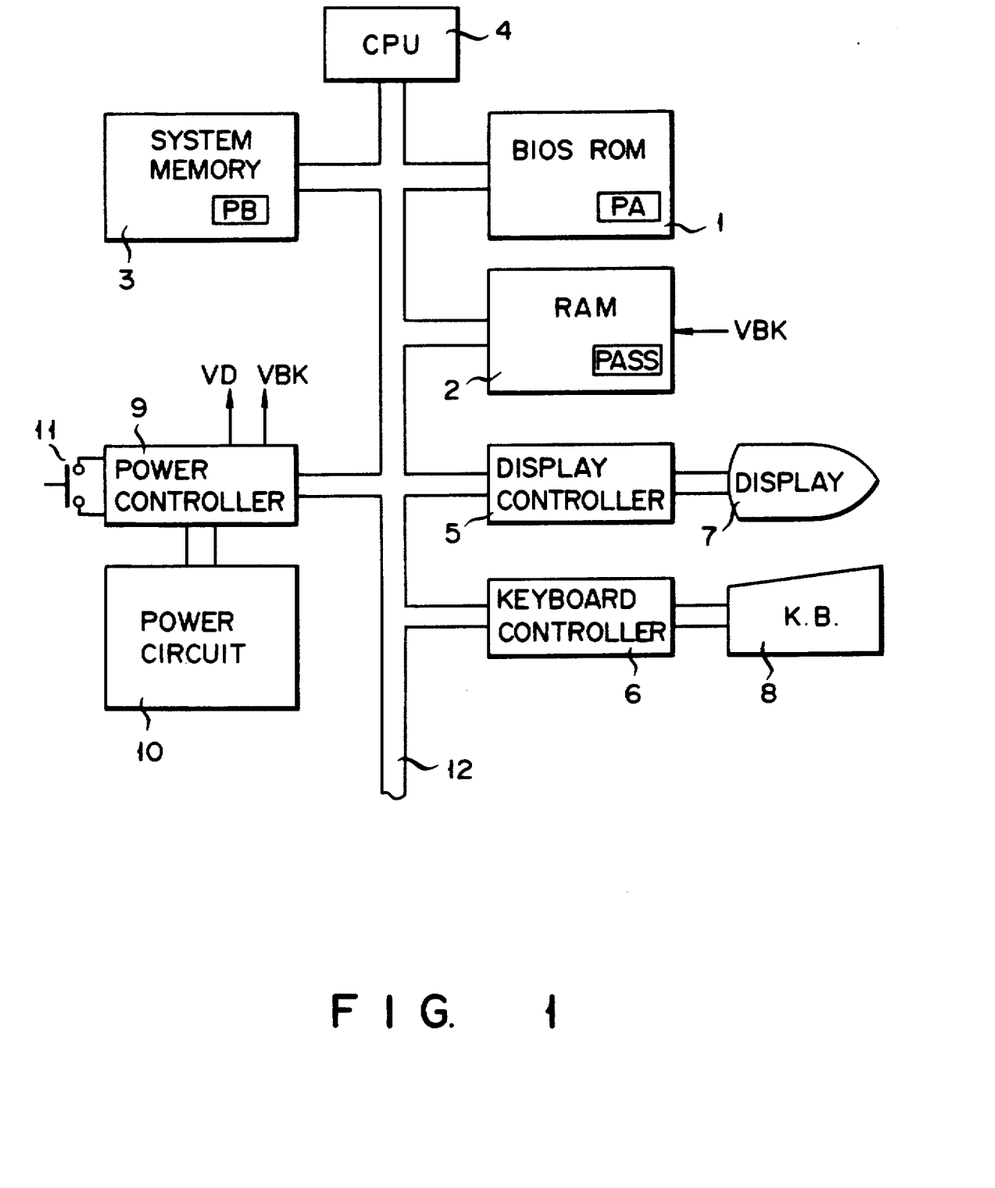
FIG. 1 is a block diagram showing an arrangement of a computer according to the first embodiment of the present

Referring now to the drawings, wherein like reference numerals designate identical or corresponding parts throughout the several views, and more particularly to FIG. 1 thereof.

FIG. 1 is a block diagram of a computer having a resume function.

The computer shown in FIG. 1 comprises a BIOS ROM (Basic Input Output System Read Only Memory) 1; a backup RAM 2; a system memory (main memory) 3; a CPU (Central Processing Unit) 4; a display controller 5; a keyboard controller 6; a display 7; a keyboard 8; a power controller 9; a power circuit 10; a power switch 11; and a system bus 12.

The BIOS ROM 1 stores a BIOS (Basic Input Output System), and a setup program PA (to be described later).

The backup RAM 2 comprises a volatile memory supplied with a backup power VBK or an EEPROM. The backup RAM 2 saves the contents of a system memory, registers in the CPU, control registers, hardware registers, an instruction pointer, and the like when the main power switch is turned off while the resume function is enabled. The backup RAM 2 includes a password area for storing a password, a check sum, and a password flag (to be described later). Normally, access to this password area is inhibited.

The system memory 3 as the main memory stores a setup program PB, data, programs, and the like. The difference between the setup programs PB and PA will be described later. The system memory 3 is used upon execution of the setup program, and is also used as a data area for the BIOS ROM 1.

The CPU 4 is the core of the arrangement of FIG. 1, and is operated in accordance with the programs stored in the system memory 3 to execute data processing.

The display controller 5 controls the operation of the display. The display 7 comprises, e.g., a liquid crystal display, a plasma display, a CRT, or the like. The display 7 displays characters, images, and the like under the control of the display controller 5.

The keyboard controller 6 detects an operation of a key at the keyboard 8, and informs the content of the key operation to the CPU 4.

The power controller 9 includes, e.g., an exclusive power control CPU for controlling power supply. When the power switch 11 is ON, the power controller 9 outputs an operation voltage VD; when the power switch is OFF, it outputs a backup voltage VBK. Although not shown, when a plurality of types of operation voltages and backup voltages are required, the power controller 9 generates required voltages.

The power circuit 10 includes, e.g., a battery, a backup battery, an AC adapter circuit, a charger, and the like, and supplies a power to the power controller 9.

The system bus 12 includes a data bus, an address bus, a control bus, and the like, and is connected to the BIOS ROM 1, the backup RAM 2, the CPU 4, the display controller 5, the keyboard controller 6, and the power controller 9 to transfer data, addresses, control signals to them.

The setup program PA stored in the BIOS ROM 1 is a program for performing various setups (e.g., ON/OFF of the resume function), and changing setup values. For example, the setup program PA includes a routine for setting an ON/OFF state of the resume function, a routine for setting a password, an IRT (Initial Reliability Test), a control routine of various I/O devices, and the like. The setup program PA is started upon operation of a specific key or keys on the keyboard 8.

The setup program PB performs setup of an ON/OFF state of the resume function, and setup of a password together with the setup program PA. In addition, the setup program PB sets up hardware components.

The operations of the setup program PB are different from those of the setup program PA except for setup of an ON/OFF state of the resume function, and setup of a password. The setup program exists as an external command of the computer.

Figure 2:
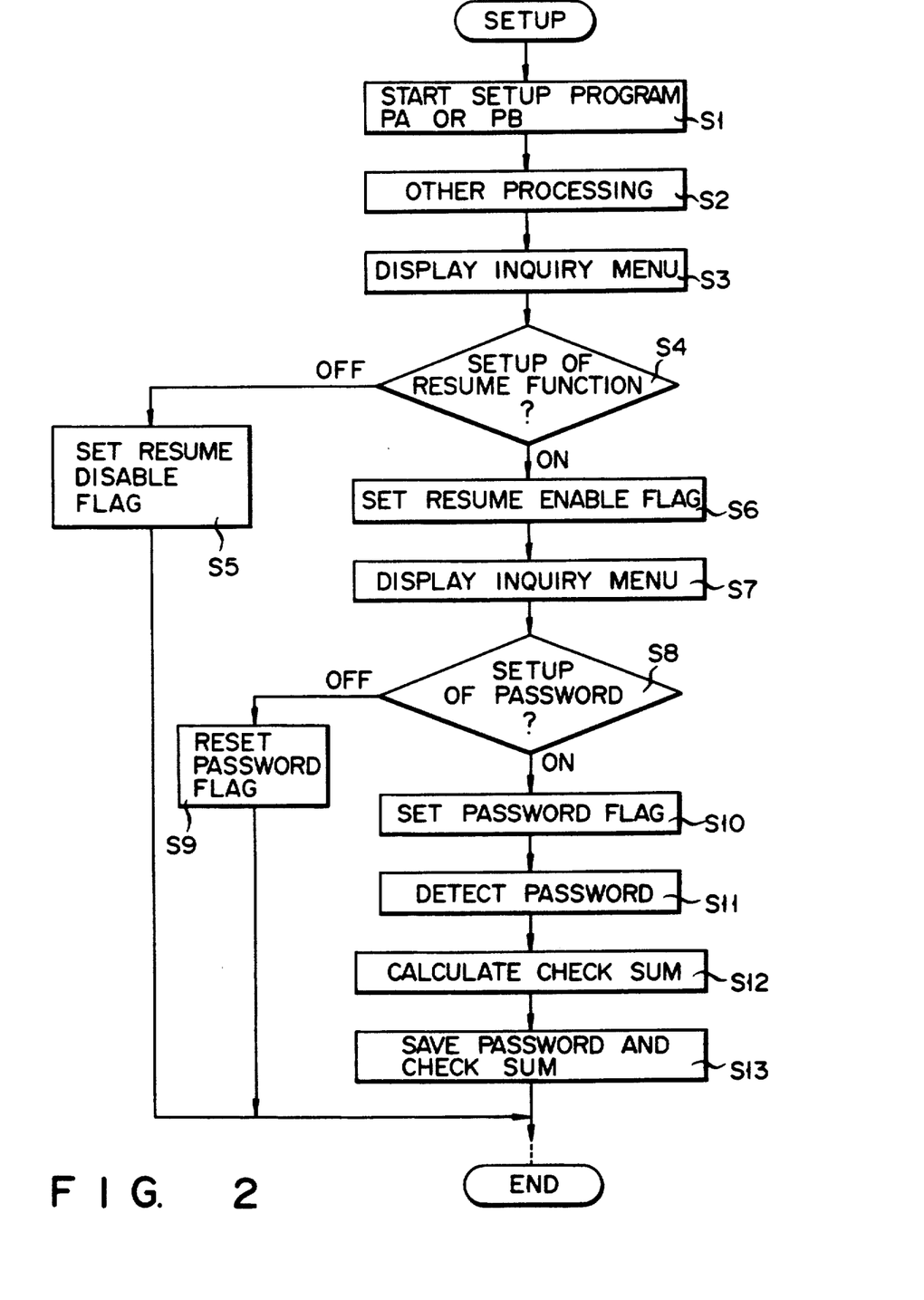
FIG. 2 is a flow chart showing an operation in a setup mode of the computer shown in FIG. 1.
Figure 3:
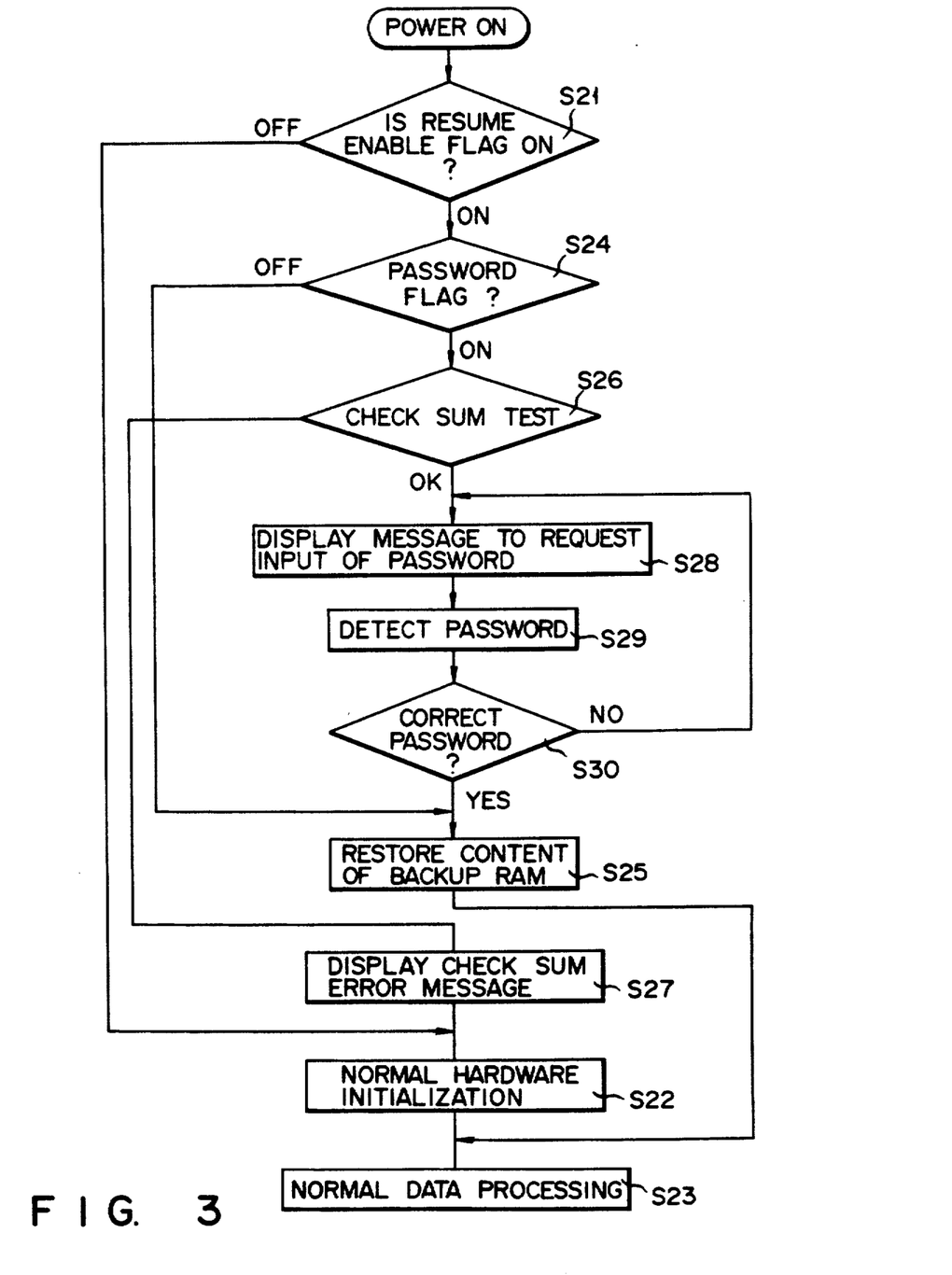
Figure 4:
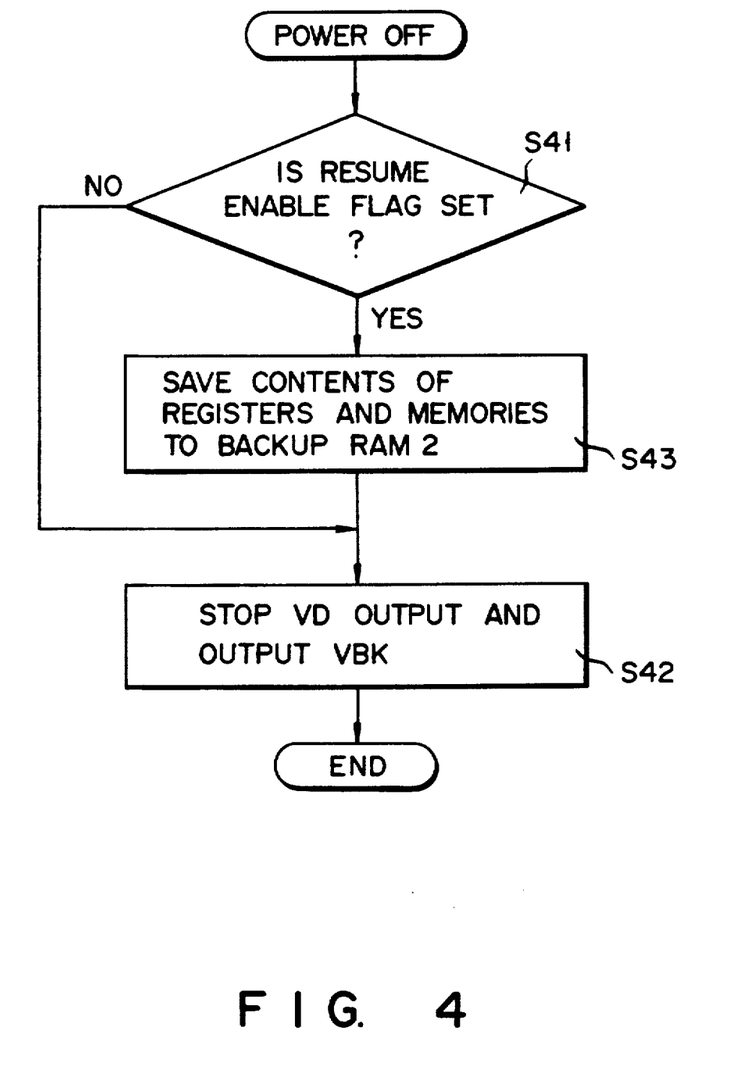
FIG. 4 is a flow chart showing an operation when the power of the computer shown in FIG. 1 is turned off.

The operation of the computer shown in FIG. 1 will be described below with reference to FIGS. 2 through 4.

The characteristic feature of the operation of the computer shown in FIG. 1 will be briefly described. When the power is turned on (i.e., when the power switch 11 is turned on), if the resume function is enabled, the computer shown in FIG. 1 causes the display 7 to display a message to prompt input of a password. When an operator inputs a correct password, the resume function is executed, and data processing and display are resumed from a state which execute immediately before the power switch 11 was turned off. On the other hand, when the power switch 11 is turned on, if the resume function is disabled, this computer initializes its hardware components in the same manner as in a computer without the resume function, and then executes data processing.

An operation of setting an ON/OFF state of the resume function of the computer with the arrangement shown in FIG. 1 will be described below with reference to FIG. 2.

After the power switch 11 is turned on, an operator depresses a predetermined key on the keyboard 8 to start the setup program PA or operates the keyboard 8 to input a command for starting the setup program PB. The keyboard controller 6 detects the key operation, and supplies a key operation signal to the CPU 4. In response to the key operation signal, the CPU 4 starts one of the setup programs PA and PB (step S1). The setup program includes various other contents, as described above, and their processing is executed if necessary (step S2). When processing of the setup program reaches a stage of setting an ON/OFF state of the resume function, the CPU 4 controls the display controller 5 to cause the display 7 to display a frame for inquiring whether or not the resume function is to be enabled (step S3). The inquiry frame may be a menu for inquiring whether or not the resume function is to be enabled. In response to this inquiry, an operator inputs an answer indicating whether the resume function is to be enabled or disabled at the keyboard 8. The input content is checked in step S4.

If the input contents indicates that the resume function is to be disabled, the CPU 4 sets a resume disable flag indicating OFF of the resume function (or resets a resume enable flag) at a predetermined position of the backup RAM 2 (step S5). Thereafter, the flow advances to other processing.

If the input content indicates that the resume function is to be enabled, the flow advances to step S6. In step S6, the CPU 4 sets the resume enable flag indicating ON of the resume function at the predetermined position of the backup RAM 2. The CPU 4 controls the display controller 5 to cause the display 7 to display a frame for inquiring whether or not a password is to be set (step S7). This inquiry frame may be a menu for inquiring whether or not a password is to be set. In response to the inquiry on the screen, an operator inputs an answer indicating whether or not a password is to be set at the keyboard 8. The input content is checked in step S8.

If the input content does not indicate that a password is to be set, a flag indicating this is set at a predetermined position of the backup RAM 2 (or resets a password flag) (step S9). Thereafter, the flow advances to other processing.

If the input content indicates that a password is to be set, the flow advances to step S10. In step S10, the CPU 4 sets the password flag indicating that a password is to be set at the predetermined position of the backup RAM 2. When setup of a password is selected, an operator inputs a password from the keyboard 8. The CPU 4 causes the display 7 to display the input password. When the displayed password is correct, the operator depresses an enter key. In response to this, input of the password is detected in step S11. A check sum corresponding to the input password is calculated (step S12). The input password and the check sum are stored in the backup RAM 2 together with the password flag (step S13). The password is saved in the backup RAM 2 in the form of ASCII codes. Thereafter, the flow advances to other processing. After the setup operation, normal data processing is continued.

When one or a plurality of passwords are set in advance in the computer to restrict users of the computer, it is checked to see if the input password coincides with one of these passwords. Only when a coincidence is found, the input password may be set in the backup RAM 2.

An operation when the power switch 11 is turned on will be described below.

When the power switch 11 is turned on, the power controller 9 detects it. The power controller 9 supplies the operation voltage VD. The power controller 9 outputs an NMI signal indicating power ON to the CPU 4. In response to the NMI signal, the CPU 4 executes the operation shown in FIG. 3.

The CPU 4 checks to see if the resume enable flag is set in the RAM 2 (step S21). If no resume enable flag is set in the backup RAM 2, since the resume operation need not be executed, the CPU 4 executes normal hardware initialization (step S22). Thereafter, the flow advances to normal data processing (step S23). If the resume enable flag is set in the RAM 2, it is checked to see if the password flag is set (step S24).

If the password flag is not set, the CPU 4 restores the contents saved in the backup RAM 2 upon previous power OFF to the original locations (step S25). For example, the saved contents of the CPU registers, the system memory 3, the hardware registers, and the instruction pointer are restored to the CPU registers, the system memory 3, the hardware registers, and the instruction pointer. Thereafter, the flow advances to normal data processing (step S23).

If it is determined in step S24 that the password flag is set, the check sum stored in the backup RAM 2 is checked, and it is also checked if the content of the backup RAM 2 is not destroyed (step S26). If an error is detected as a result of checking, an error message is displayed on the display 7 (step S27), and hardware initialization is executed (step S22). Thereafter, the flow advances to normal data processing (step S23).

If it is determined in step S26 that the check result is OK (no error), a message to urge the operator to input a password is displayed on the display 7 (step S28). When the operator inputs a password according to this display, it is checked to see if the input password coincides with the prestored password (stored in the backup RAM 2 in step S13). If a coincidence is found between the two passwords, steps S25 and S23 described above are executed. On the other hand, if a noncoincidence is found between the input password and the prestored password, the flow returns to step S28 to urge the operator to reinput the password.

When the above-mentioned processing sequence is adopted, a state of data processing and a display state immediately before the power switch was turned off are resumed only when a correct password is input. That is, resume processing is executed. In other words, execution of resume processing is inhibited until the correct password is input.

More specifically, even when the resume function is enabled, the flow forms an endless loop unless a predetermined password is input, and the content of the backup RAM 2 is not restored in the registers, and the like. In addition, the content of the backup RAM 2 can be prevented from being destroyed. Even when the power switch 11 is turned off during the endless loop, if the power switch 11 is turned on again, processing is executed from step S21 in FIG. 3. Therefore, the content of the RAM 2 ca be protected.

An operation of the CPU 4 when the power switch 11 is turned off will be described below with reference to FIG. 4.

When the power controller 9 detects that the power switch 11 is turned off, it sends a signal indicating this, e.g., the NMI signal to the CPU 4. In response to the NMI signal, the CPU 4 executes the processing shown in FIG. 4. The CPU 4 first checks if the resume enable flag is set in the backup RAM 2 (step S41). If the resume enable flag is not set, the CPU 4 controls the power controller 9 to stop output of the operation voltage VD and to output the backup voltage VBK (step S42).

When the resume enable flag is set, the CPU 4 saves the contents of the registers in the CPU 4, the system memory 3, the control registers, the hardware registers, and the instruction pointer (pointer indicating a position of a program in execution when the power switch 11 is turned off) to the backup RAM 2. As described above, the saved contents are restored from the backup RAM 2 to original locations when the power switch 11 is turned on again. Thereafter, the CPU 4 controls the power controller 9 to stop the output of the operation voltage VD and to output the backup voltage VBK (step S42).

The backup voltage VBK is kept as the output until the power switch 11 is turned on and the operation voltage VD is generated. Thus, the contents saved in the backup RAM are held. When the backup voltage VBK is also supplied to the system memory 3, the content of the system memory 3 need not be saved to the backup RAM 2.

As described above, according to this embodiment, even when the resume function is enabled, the system cannot be resumed to a state immediately before the power switch was turned off unless a correct password is input. For this reason, data saved by the resume function can be prevented from being destroyed or disclosed to a third party.

The present invention is not limited to the above embodiment. In the above embodiment, two types of setup programs are used. However, a single setup program may be used.

A password is used to check whether or not an operator is a legal user. In a computer comprising another personal identification data, e.g., ID card reader, an ID card may be used in place of a password.

Figure 5:
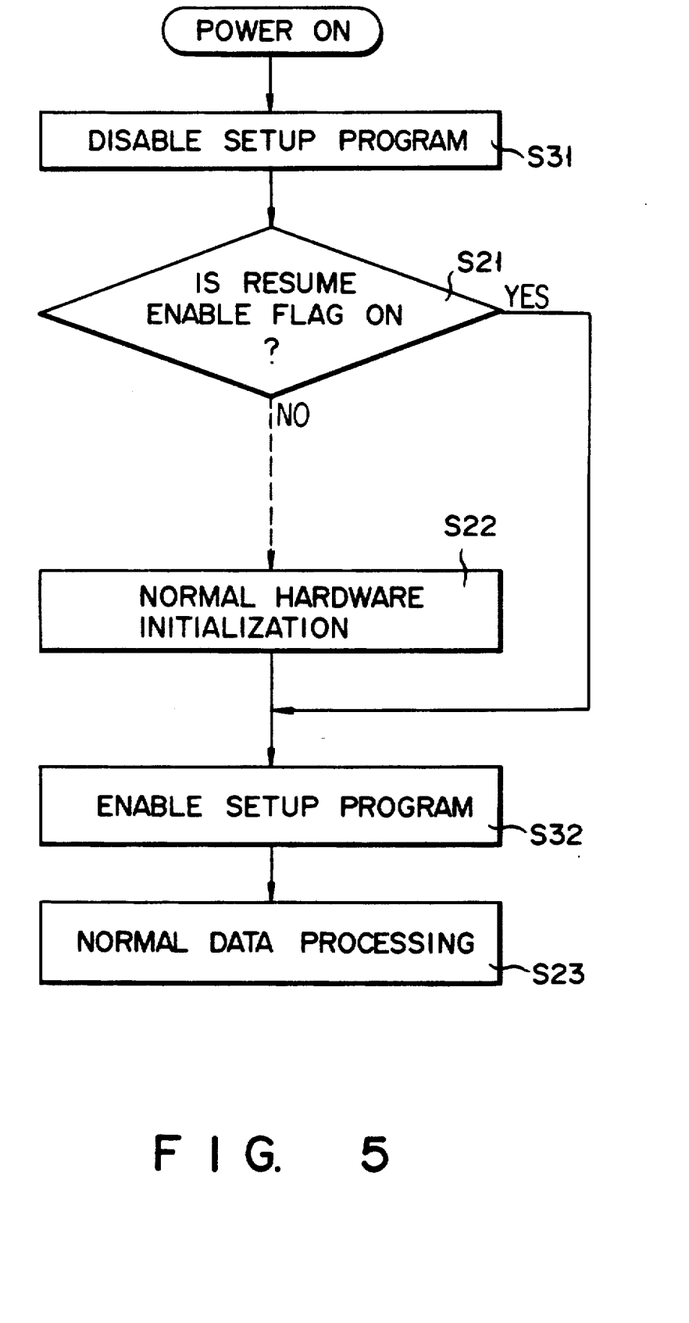
FIG. 5 is a flow chart showing a modification of the flow shown in FIG. 3.

If the setup program PA or PB is ready to start when the power switch 11 is turned on, the resume function may be switched to be OFF or setup of a password may be switched to OFF. In order to avoid this, as shown in FIG. 5, step S31 of disabling execution of the setup program may be inserted before step S21, and step S32 of enabling execution of the setup program may be inserted before step S23. Alternatively, execution of the setup program may be disabled in a loop constituted by steps S28, S29, and S30.

Obviously, numerous (additional) modifications and variations of the present invention are possible in light of the above teachings. It is therefore to be understood that within the scope of the appended claims, the invention may be practiced otherwise than as specifically described herein.

What is claimed is:

1. A data processing system which has a resume function and a security management function, and which is capable of operating a plurality of programs, comprising:

switch means for turning on and off a main power of said data processing system;

switch detection means coupled to said switch means for detecting that said switch means is turned on or off;

backup memory means coupled to said switch detection means, responsive to a detection result of said switch detection means indicating that the main power is off, for holding contents of data processing immediately before the main power is turned off;

identification data holding means for holding identification data coupled to an input means for inputting identification data for security management;

discrimination means coupled to said switch detection means, identification data holding means, and said input means and responsive to said switch detection means, for discriminating whether identification data, input from said input means, after said switch means is turned on coincides with identification data stored in said identification data holding means;

executing means for, in response to detection of a coincidence in said discrimination means, executing data processing, from processing executed immediately before the main power is turned off, in accordance with a storage content of said backup memory means, and means for inhibiting a resumption of data processing immediately before the main power is turned off, to prevent contents of the data processing from being revealed to an unauthorized person and for inhibiting an operation which erases the contents saved in said backup memory means, when non-coincidence is detected by said discrimination means.

2. A data processing system according to claim 1, further comprising:

selection means for selection of when identification data is to be collected and enabling said discrimination means in response to the selection; and means, coupled to said identification data holding means, for allowing setting of the identification data in said holing means.

3. A data processing system according to claim 1, further comprising:

second selection means for making a selection of enabling/disabling the resume function and means for making a selection of when to collate identification data, wherein said discrimination means is operated when said second selection means selects enabling of the resume function and collation of the identification data.

4. A data processing system according to claim 3, further comprising:

means for setting a first flag indicating ON/OFF of the resume function; and means for setting a second flag indicating when identification data is to be collated.

wherein said discrimination means is operated when the first flag indicating that the resume function is enabled and the second flag indicating that the identification data is to be collated are set.

5. A data processing system according to claim 1, further comprising:

display means for displaying data; and means for, when said switch means is turned on, causing said display means to display a message for indicating a request for input identification data.

6. A system according to claim 1, wherein said input means comprises a keyboard.

7. An operating method of a system which has a resume function and a security management system and which can run a plurality of programs, comprising prestoring identification data, wherein said system comprises:

a data processor for processing data;

a power switch for indicating an ON or OFF state of this system;

holding means for holding contents of data processing performed by said data processor, in response to an OFF state of the power switch;

inputting means for inputting identification data for security management in response to an ON state of the power switch; and collating means for collating identification data input by the inputting means and prestored identification data to ensure system security;

wherein said operating method comprises the steps of:

processing data by means of the data processor;

turning off the power switch;

holding the contents of the data processing in said holding means and stopping the data processing in response to OFF of said power switch;

turning on said power switch again;

inputting identification data by means of inputting means after said power switch is turned on;

collating the input identification data and prestored identification data;

resuming data processing from a point at which said power switch is turned off, in accordance with a content held in the holding means in the holding step, when a coincidence between the input identification data and prestored identification data is detected in the collating step by the collating means and;

inhibiting a resumption of data processing immediately before the main power is turned off, to prevent contents of the data processing from being revealed to an unauthorized person and for inhibiting an operation which erases the contents saved in said backup memory means, when non-coincidence between the input identification data and the prestored identification data is detected.

8. A method according to claim 7, wherein said system further comprises:

means for selecting an ON/OFF state of a resume function for selecting when data processing resumes from said point at which said power switch is turned off; and means for selecting when identification data is to be collated.

9. A method according to claim 8, further comprising the steps of:

discriminating when the ON state of the resume function is selected; and discriminating when collation of identification data is selected, wherein the collation steps are executed when said discriminating steps discriminate that the resume function is ON and the identification data is to be collated.

10. A method according to claim 8, said system further comprising means for making a display of inquiring whether or not the resume function is to be enabled and means for a display of inquiring whether or not identification data is to be collated in a setup mode.

* * * * *